April 3, 1934. G. D. GUSTAFSON ET AL 1,953,601
SIFTING UTENSIL
Filed July 11, 1932
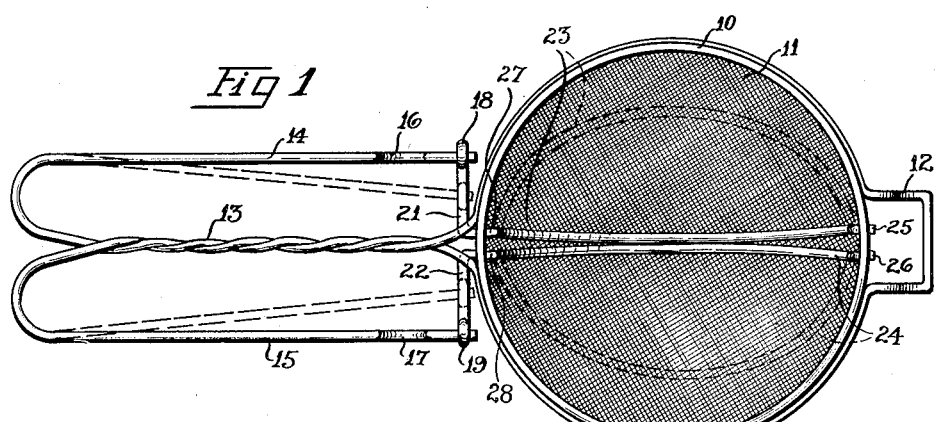
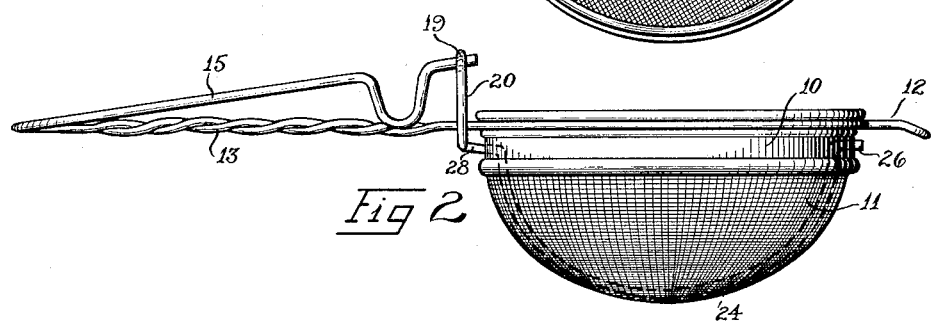
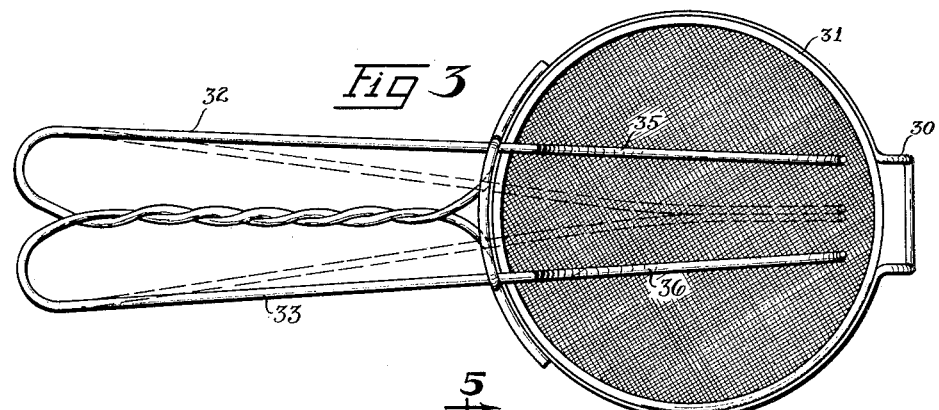
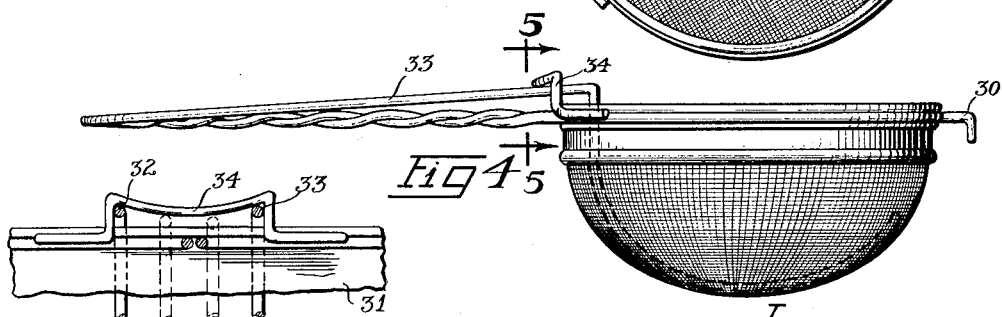

Patented Apr. 3, 1934

1,953,601

UNITED STATES PATENT OFFICE 1,953,601

SIFTING UTENSIL

Gunnar D. Gustafson and Gustaf P. Larsson, Chicago, Ill., assignors to Largus Manufacturing Company, Chicago, Ill., a corporation of Illinois Application July 11, 1932, Serial No. 621,790

7 Claims. (Cl. 209—374)

Our invention relates to a straining or sifting device known as a sieve, and more particularly to that type of kitchen utensil commonly used for flour, meal and the like.

One of the objects of our invention is to provide a new and useful utensil having sifting and straining means through which the finer particles of a pulverized or granulated substance, such as flour, meal and the like, are passed so as to separate them from the coarser and larger particles of that substance.

Another object of our invention is to provide a utensil as aforesaid having new and useful agitating means adapted to operate in association with the sifting and straining means as aforesaid whereby lumps and large and coarse particles of a pulverized or granulated substance, such as flour, meal and the like, are disintegrated and so stirred and mixed as to aid the filtration and sifting of the finer particles thereof from coarser particles.

A further object of our invention is the provision of a new and useful utensil as aforesaid so arranged and constructed as to enable the user thereof to hold the same in one hand, and simultaneously with that hand operate and actuate the agitating members of the utensil, thus making available for a variety of uses the other hand of the user. By reason of our present invention, the user of a utensil of this character may easily and expeditiously hold and operate the same in one hand, and at the same time utilize the free or other hand for the purpose of pouring the flour, meal and the like into the utensil, or for the purpose of stirring or agitating the ingredients into which the flour, meal and the like is being sifted.

A further object of our invention is the provision of novel actuating and agitating means for a utensil as aforesaid.

A further object of our invention is to provide a utensil of the character indicated which is simple and economical in construction and which may be utilized with a maximum of ease, benefit, convenience and facility to the user.

Other objects and advantages of the invention will appear from a consideration of the following detailed description and appended claims in conjunction with the accompanying drawing, in which Figure 1 is a top view of a form of our invention;

Fig. 2 is a side view of the same form of our invention;

Fig. 3 is a top view of a modified form of our invention;

Fig. 4 is a side view of the utensil shown in Fig. 3;

Fig. 5 is a fragmentary view of the utensil shown in Fig. 3 taken along the lines 5—5 of Fig. 4.

Referring to the drawing in detail, the utensil shown in Figs. 1 and 2 consists of an annular frame 10, which may be constructed of any suitable material such as tin coated metal or the like. Suitably fastened to the annular frame 10, and depending therefrom, in a cup-like form, is a wire mesh or screen 11, or any other suitable foraminous element. A cold rolled steel wire is suitably formed so as to provide a hook supporting member 12, and is then bent and formed so as to encircle and engage and securely retain the annular frame 10, from which such wire extends, oppositely of the hook member 12, in the form of a twist member 13, as indicated in Figs. 1 and 2. The free ends of the wire are then bent back so as to provide resilient gripping members 14 and 15.

Further and additional gripping arrangements are provided in the form of U-shaped bends 16 and 17. The free ends of the members 14 and 15 are inserted into and received by eyes 18 and 19 of arms 20. The arms 20 project upwardly from their integrally related lateral members 21 and 22 which are continuations of cold rolled steel wires 23 and 24 which have been bent and arranged so as to provide freely movable pins 25 and 26 to be inserted in suitable holes in the frame 10, then bent and arranged so as to conform snugly but freely to the contour of the wire mesh 11, and then bent and arranged so as to provide freely movable pivoting members 27 and 28, to be received likewise by the frame 10 in the manner indicated in Figs. 1 and 2. In other words, the wires 23 and 24 are integral pieces constituting the agitating member proper, the pivots and the arrangement as above described for engaging the resilient gripping members.

Referring now to the modified form of our invention shown in Figs. 3, 4 and 5, the frame and wire mesh are similar to that hereinabove described, and the difference between the two forms is found in the arrangement with respect to the actuation of the agitating members. The hook supporting member 30 is formed likewise of a cold rolled steel wire and thereafter such wire is suitably formed and arranged so as to engage and firmly and securely retain the frame 31 from which the wire, oppositely of the hook member 30, is twisted and formed into the handle member as indicated in Figs. 3 and 4. The free ends of the wire are then bent back so as to provide resilient gripping members 32 and 33 and are received and retained by a wire member 34, which is bent and formed as indicated in Figs. 4 and 5, and suitably welded or fastened to the frame 10. Immediately inside the wire member 34 the free ends of the gripping members 32 and 33 are bent and formed into agitating members 35 and 36 and are so arranged that they conform snugly but freely to the contour of the wire mesh.

In operation (Figs. 1 and 2), a slight pressure exerted upon the resilient gripping members 14 and 15, particularly the U-shaped members 16 and 17, will cause the upwardly projecting arms 20 to be drawn toward each other, with the result that the wires 23 and 24 will pivot in the holes of the frame 10, thus causing the wires to pass along the surface of the wire mesh snugly but freely. Upon release of the pressure, the resilient members 14 and 15 will return to their normal positions, and of course the arms 20, and consequently the agitators, will return to normal. Upon repeatedly exerting and releasing pressure upon the resilient gripping members as aforesaid, one is able thereby to agitate, mix, and stir any granulated or pulverized substance which may be placed in the utensil.

By reason of such agitation and mixing, the finer particles of the substance will be separated from the coarser particles and will pass, filter through, and fall or otherwise become sifted from the wire mesh. Similarly, in the case of the modified form of our invention, upon pressure being exerted upon the resilient gripping members 32 and 33, the agitators 35 and 36 are actuated in such a manner that they are drawn together. When the pressure is released, the resilient members and agitators will return to normal position as defined by the member 34. The depressed configuration of the top of the member 34 serves to assure a closer relation between the agitators and the wire mesh as the agitators move back and forth. Upon repeatedly exerting and releasing pressure upon the gripping members, it should be evident that a thorough mixing and agitating condition is brought about.

It will be further evident that the user of either of the forms of our invention which we have shown and described may easily, and with facility, hold the utensil in one hand, and at the same time use that hand for the purpose of creating the mixing or agitating operation. The user may use his or her free hand for the purpose of pouring or otherwise placing the flour, meal and the like to be sifted into the utensil, or he or she may utilize such free hand for the purpose of mixing or stirring the ingredients or other materials into which the flour, meal and the like is being sifted. The hook supporting members are provided so as to enable the user to support the utensil upon the periphery of the bowl or other object into which the flour, meal and the like are being sifted.

While only certain specific embodiments of our invention have been shown and described herein, it will be apparent to those skilled in the art that various advantages and modifications other than those disclosed herein may be made in the details and design without departing from the spirit and scope of our invention as set forth in the appended claims.

We claim:

1. A sifting and straining utensil, consisting of an annular frame, a foraminous element attached to and supported by said frame, a hook support member affixed thereto, agitators disposed within said frame adapted to be simultaneously actuated in opposition to one another, and a handle comprising gripping members in operable engagement with said agitators and adapted to actuate the same whereby said utensil may be held and operated in one hand of the user.

2. A sifting and straining utensil consisting of an annular frame, a foraminous element attached to and supported by said frame, a plurality of independently operating agitators disposed within said frame, and adapted to simultaneously oppose each other slidably along the surface of an appreciable area of said foraminous element and a handle comprising hand actuating members in operable engagement with said agitators and adapted to actuate the same whereby said utensil may be held and operated in one hand of the user.

3. A sifting and straining utensil consisting of an annular frame, a foraminous element attached to and supported by said frame, a plurality of independently operating agitators disposed within said frame, and adapted to simultaneously oppose each other slidably along the surface of an appreciable area of said foraminous element and a handle comprising resilient gripping members, said resilient gripping members being in operable engagement with said agitators and adapted to actuate the same whereby said utensil may be held and operated in one hand of the user.

4. A sifting and straining utensil consisting of an annular frame, a foraminous element attached to and supported by said frame, a plurality of independently operating agitators pivotally mounted in said frame and adapted to simultaneously oppose each other slidably along the surface of an appreciable area of said foraminous element, and a handle comprising independently operable resilient gripping members, said gripping members being in operable engagement with said agitators and adapted to actuate the same.

5. A sifting and straining utensil consisting of an annular frame, a foraminous element attached to and supported by said frame, a plurality of independently operating agitators pivotally mounted in said frame and adapted to simultaneously oppose each other slidably along the surface of an appreciable area of said foraminous element, and a handle comprising independent pressure operable resilient gripping members, said agitators carrying means operatively connecting said gripping members and said agitators.

6. A sifting and straining utensil consisting of an annular frame, a foraminous element attached to and supported by said frame, a plurality of independently operating agitators pivotally mounted in said frame and adapted to simultaneously oppose each other slidably along the surface of an appreciable area of said foraminous element, and a handle comprising independent pressure operable resilient gripping members, said agitators being formed exteriorly of said frame adjacent said handle into upwardly projecting pressure responsive arms.

7. A sifting and straining utensil consisting of an annular frame, a foraminous element attached to and supported by said frame, independently operating agitators disposed within said frame and pivotally mounted in opposite sides thereof, and a handle comprising individual resilient gripping members, said gripping members being in operable engagement with said agitators and adapted to simultaneously actuate the same in controlled opposition to one another.

GUNNAR D. GUSTAFSON.
GUSTAF P. LARSSON.